United States Patent
Yeh

(10) Patent No.: US 7,429,726 B2
(45) Date of Patent: Sep. 30, 2008

(54) IMAGE DISPLAYING AND CAPTURING DEVICES

(75) Inventor: Kuan-Lin Yeh, Hsinchu (TW)

(73) Assignee: TPO Displays Corp., Miao-Li County (TW)

( * ) Notice: Subject to any disclaimer, the term of this patent is extended or adjusted under 35 U.S.C. 154(b) by 15 days.

(21) Appl. No.: 11/532,956

(22) Filed: Sep. 19, 2006

(65) Prior Publication Data

US 2008/0067329 A1    Mar. 20, 2008

(51) Int. Cl.
*G06M 7/00* (2006.01)
*H01J 40/14* (2006.01)

(52) U.S. Cl. .................. 250/221; 250/214 R; 345/175; 345/207

(58) Field of Classification Search ............. 250/214 R, 250/214 AL, 221; 345/207, 175
See application file for complete search history.

(56) References Cited

U.S. PATENT DOCUMENTS

| | | | |
|---|---|---|---|
| 6,243,069 B1 * | 6/2001 | Ogawa et al. .............. 345/102 |
| 6,911,972 B2 * | 6/2005 | Brinjes ........................ 345/175 |
| 2003/0076295 A1 * | 4/2003 | Nakajima ................... 345/156 |
| 2006/0033729 A1 * | 2/2006 | Yoshida et al. ............. 345/207 |
| 2006/0103637 A1 * | 5/2006 | Yamaguchi et al. ........ 345/175 |
| 2007/0018078 A1 * | 1/2007 | Miyazawa ................ 250/214.1 |

OTHER PUBLICATIONS

"Late-News Paper: A Touch Panel Function Integrated LCD Including LTPS A/D Converter" Nakamura, et al., 2005.
"A TFT-LCD with Image Capture Function Using LTPS Technology" Nakamura et al., 2003.
"Quite a New Approach for System-on-Glass Technology Based on Low-Temperature Polycrystalline Silicon" Toshiba Matsushita Display Technology Co, Ltd., 2003.
"A Touch Panel Function Integrated LCD Using LTPS Technology" Tada, et al., 2004.

* cited by examiner

Primary Examiner—Georgia Y. Epps
Assistant Examiner—Francis M Legasse, Jr.
(74) Attorney, Agent, or Firm—Thomas, Kayden, Horstemeyer & Risley

(57) ABSTRACT

A system for displaying and capturing images is provided. The system includes a display unit, a detection module. The display unit provides a first light according to a scan signal and a data signal. The detection module captures a second light and comprises a photo detection unit, a transformation unit, and a switch unit. The photo detection unit detects intensity of the second light. The transformation unit transforms the light intensity into a voltage signal. The switch unit outputs the voltage signal according to a selection signal.

16 Claims, 8 Drawing Sheets

IMAGE DISPLAYING AND CAPTURING DEVICES

BACKGROUND OF THE INVENTION

1. Field of the Invention

The invention relates to a system for displaying and capturing images, and in particular to a system having a display mode, a touch mode, and a scan mode.

2. Description of the Related Art

With the rise of electronic commerce and the increased transmission rate of information exchange, conventional input interfaces, such as keyboards and mice, cannot adequately satisfy the requirement for rapid data transmission. Thus, new modes of inputting information, such as vocal and handwritten input, often replace conventional input interfaces. One example of an alternative input interface is the touch panel.

In conventional touch panels, because leakage current of amorphous silicon thin film transistors (a-Si TFTs) is sensitive to light, a-Si TFTs are employed to form photodiodes for using as image sensors. Jeong Hyun Kim of LG. Philips LCD Co. discloses a fingerprint scanner, in which a photodiode formed by an a-Si TFT senses the light reflected from a finger.

BRIEF SUMMARY OF THE INVENTION

Systems for displaying and capturing images are provided. An exemplary embodiment of a system, which displays and captures images, comprises a plurality of display unit and a plurality of detection module. Each display unit provides a first light according to a scan signal and a data signal. Each detection module captures a second light and comprises a photo detection unit, a transformation unit, and a switch unit. The photo detection unit detects the intensity of the second light. The transformation unit transforms the light intensity into a voltage signal. The switch unit outputs the voltage signal according to a selection signal.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
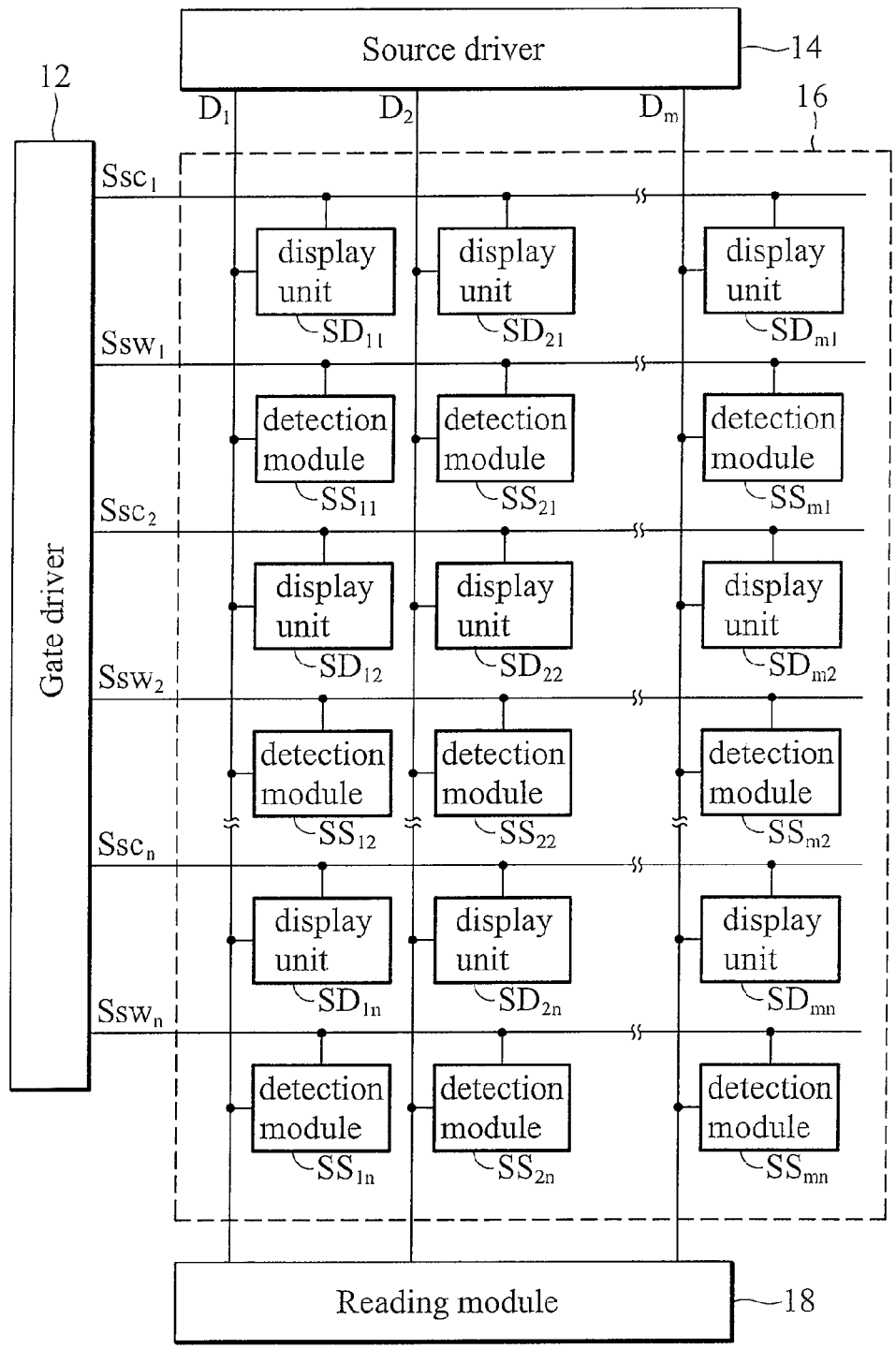
FIG. 1 is a schematic diagram of an exemplary embodiment of a display panel of a system for displaying and capturing images.

Systems for displaying and capturing images are provided. An exemplary embodiment of a system comprises a display panel, as shown in FIG. 1. Referring to FIG. 1, a display panel 10 comprises a gate driver 12, a source driver 14, display units $SD_{11}$~$SD_{mn}$, detection modules $SS_{11}$~$SS_{mn}$, a reading module 18, and a backlight module 16 beneath the display units $SD_{11}$~$SD_{mn}$ and detection modules $SS_{11}$~$SS_{mn}$.

Gate driver 12 provides scan signals $Ssc_1$~$Ssc_n$ to gate lines and selection signals $Ssw_1$~$Ssw_n$ to selection lines. Frequency of one scan signal exceeds that of one selection signal. In this embodiment, the frequency of scan signals $Ssc_1$~$Ssc_n$ are approximately 60 Hz, and that of selection signals $Ssw_1$~$Ssw_n$ are approximately 5 Hz.

Source driver 14 provides data signals $D_1$~$D_m$ to data lines. Backlight module 16 is a light source. Display units $SD_{11}$~$SD_{mn}$ display images according to scan signals $Ssc_1$~$Ssc_n$ and data signals $D_1$~$D_m$. Detection modules $SS_{11}$~$SS_{mn}$ detect light and output voltage signals. In this embodiment, each display unit is coupled to a detection module. For example, display unit $SD_{11}$ is couple to detection module $SS_{11}$.

Reading module 18 is coupled to the data lines for reading the intensity of the detected light and calculating the voltage signals output from detection modules $SS_{11}$~$SS_{mn}$ through an integral method or a differential method.

In a display mode, display unit $SD_{11}$ provides first light according to the scan signal $Ssc_1$ and the data signal $D_1$. In some embodiments, display unit $SD_{11}$ utilizes a color filter to filter the first light into a desired color.

In a touch mode, the display panel 10 is touched by an input tool (such as an optic-pen) for receiving data. For example, when detection module $SS_{11}$ detects the intensity of light emitted from the optic-pen, the detected light intensity is provided to reading module 18. The detection module $SS_{11}$ then generates a corresponding voltage signal according to the detected light intensity. Reading module 18 processes the voltage signal from the detection module $SS_{11}$. In some embodiments, when the system operates in the display model again, the data output from the optic-pen can be displayed. In other some embodiments, icons displayed on the system can be selected by the input tool to enable corresponding functions of the system according to the voltage signal.

In a scan mode, gate driver 12 stops providing scan signal $Ssc_1$ and source driver 14 stops providing data signal $D_1$, thus display unit $SD_{11}$ stops providing the first light, and backlight module 16 is utilized to provide light.

When the light provided by backlight module 16 is emitted toward an object, such as display unit $SD_{11}$ in FIG.1, the object reflects light of different degrees to detection module $SS_{11}$ according the gray levels of the surface of the object. Detection module $SS_{11}$ generates the voltage signal according to the reflected light. Thus, reading module 18 determines the gray levels of the surface of the object according to the voltage signal. When the display panel 10 is again operated in the display mode, the surface of the object is displayed according to the determined result output from reading module 18.

Figure 2:
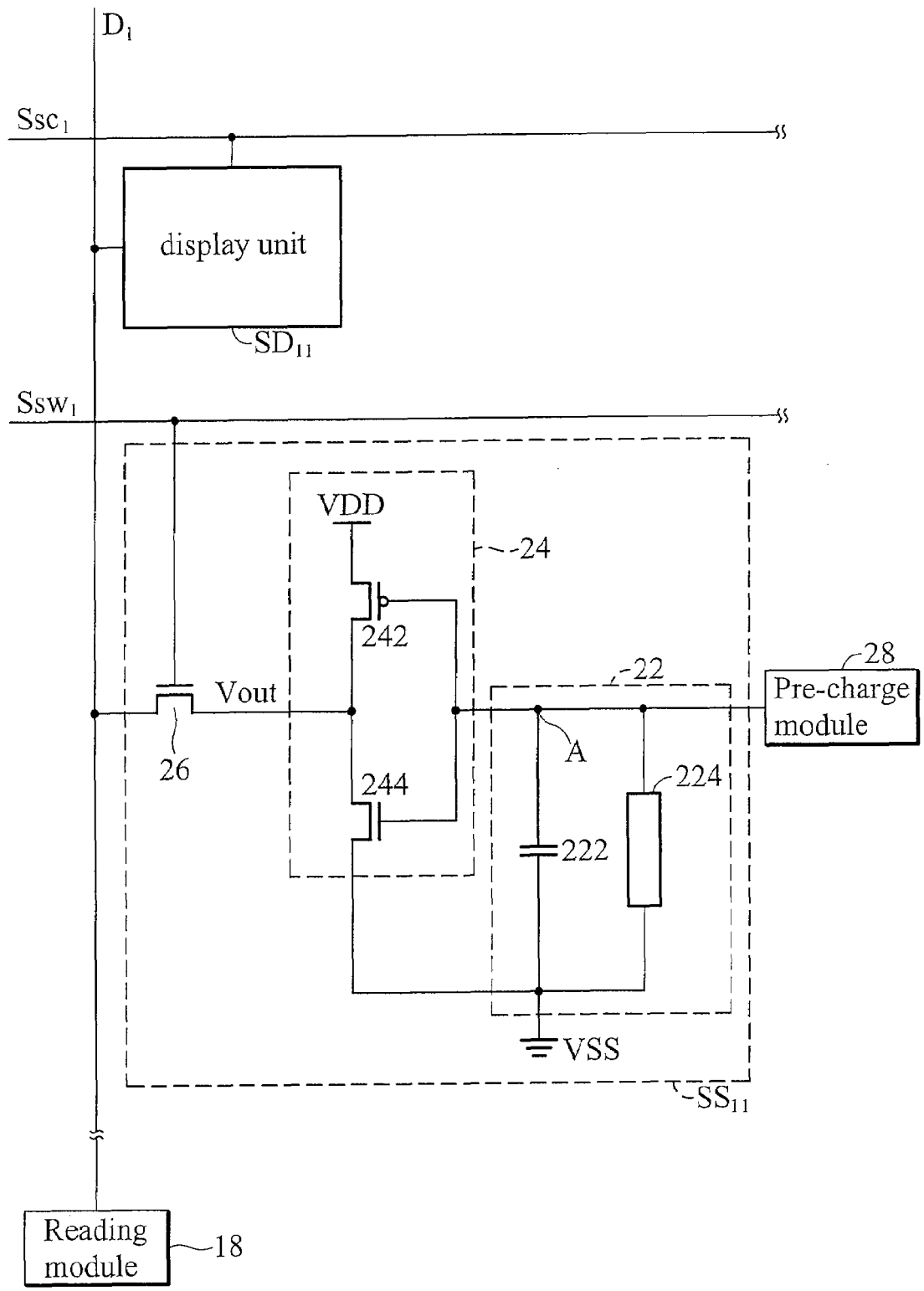
FIG. 2 depicts an embodiment of detection module $SS_{11}$ in FIG. 1.

FIG. 2 depicts an embodiment of detection module $SS_{11}$. An equivalent circuit of display unit $SD_{11}$ is well known to those skilled in the field, thus, description thereof is omitted. Detection module $SS_{11}$ comprises a photo detection unit 22, a transformation unit 24, and a switch unit 26.

The photo detection unit 22 detects intensity of a light. In this embodiment, photo detection unit 22 comprises a capacitor 222 and a photo sensor 224. Capacitor 222 is coupled between a point A and a low voltage level VSS. Photo sensor 224 is connected with capacitor 222 in parallel and the conductance thereof changes according to the intensity of the light for controlling the discharge time of capacitor 222. When the intensity of the light is stronger, the conductance is higher.

Additionally, capacitor 222 is charged by a pre-charge module 28. When the level of point A reaches a high voltage level VDD, pre-charge module 28 stops charging capacitor 222.

The transformation unit 24 transforms the intensity of the light into a voltage signal Vout. In this embodiment, transformation unit 24 is an inverter comprising transistors 242 and 244. Transistor 242 is a P-type and transistor 244 is an N-type. Transistor 242 comprises a gate coupled to point A, a source receiving the high voltage level VDD, and a drain outputting voltage signal Vout. Transistor 244 comprises a gate coupled to point A, a source receiving the low voltage level VSS, and a drain coupled to the drain of transistor 242.

The switch unit 26 outputs the voltage signal Vout according to selection signal $Ssw_1$. In this embodiment, switch unit 26 is a transistor comprising a gate receiving selection signal $Ssw_1$, a source coupled to reading module 18, and a drain coupled to the drain of transistor 242.

The operation of detection module $SS_{11}$ shown in FIG. 2 is described as follows. First, capacitor 222 is charged by pre-charge module 28. When the level of point A reaches the high voltage level VDD, transistor 244 is turned on and pre-charge module 28 stop charging capacitor 222.

When photo sensor 224 detects light, the conductance of the photo sensor is changed according to the intensity of the detected light. When the intensity of the detected light is stronger, the conductance is higher, so that the discharge speed of capacitor 222 is more rapid. Thus, transformation unit 24 generates the voltage signal Vout according to the voltage of point A. When switch unit 26 receives selection signal $Ssw_1$, switch unit 26 is turned on, and the voltage signal Vout is transmitted to reading module 18 through data line. Noted that when the switch unit 26 is turned on by selection signal $Ssw_1$, the voltage of point A is transformed to voltage signal Vout through transformation unit 24. Thus, the voltage of point A would not be interfered because point A is isolated from the line of data signal D1 by transformation unit 24, thereby preventing voltage sharing between point A and the line of data signal D1.

Figure 3A:
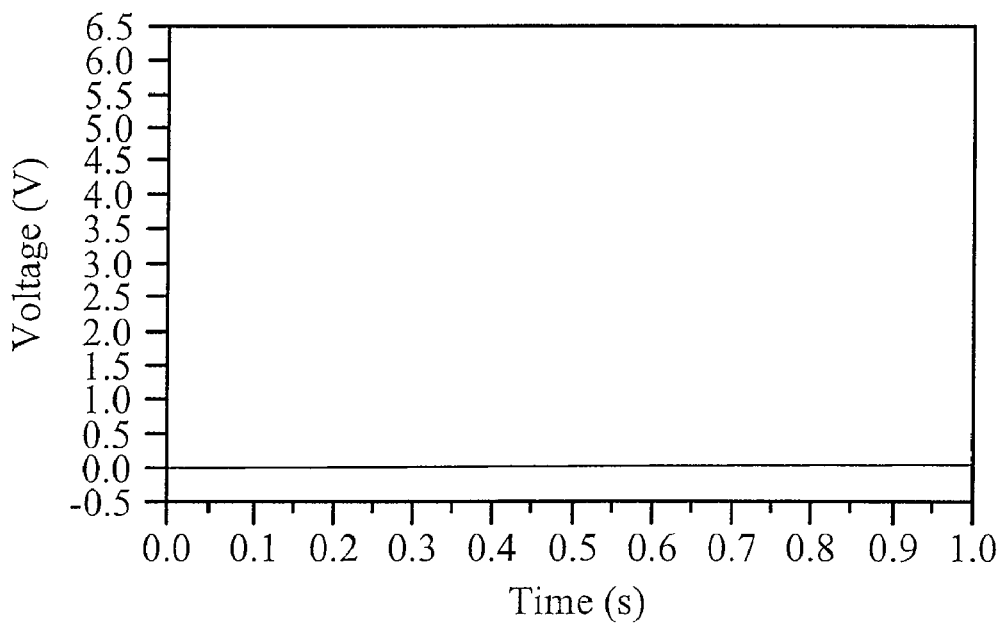
FIGS. 3a~3c are characteristic curves of the voltage signal Vout.
Figure 3B:
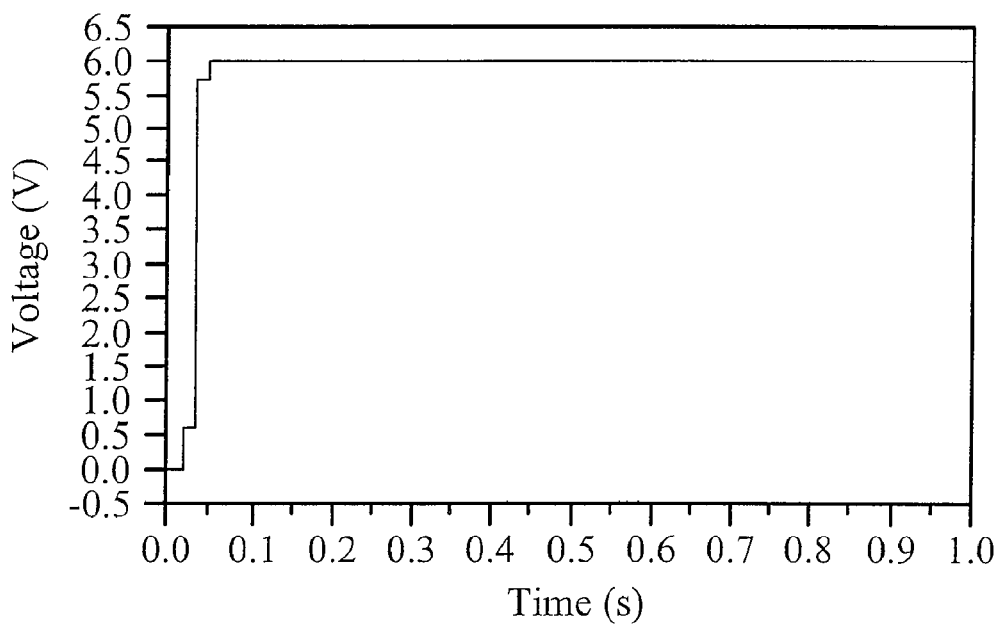
Figure 3C:
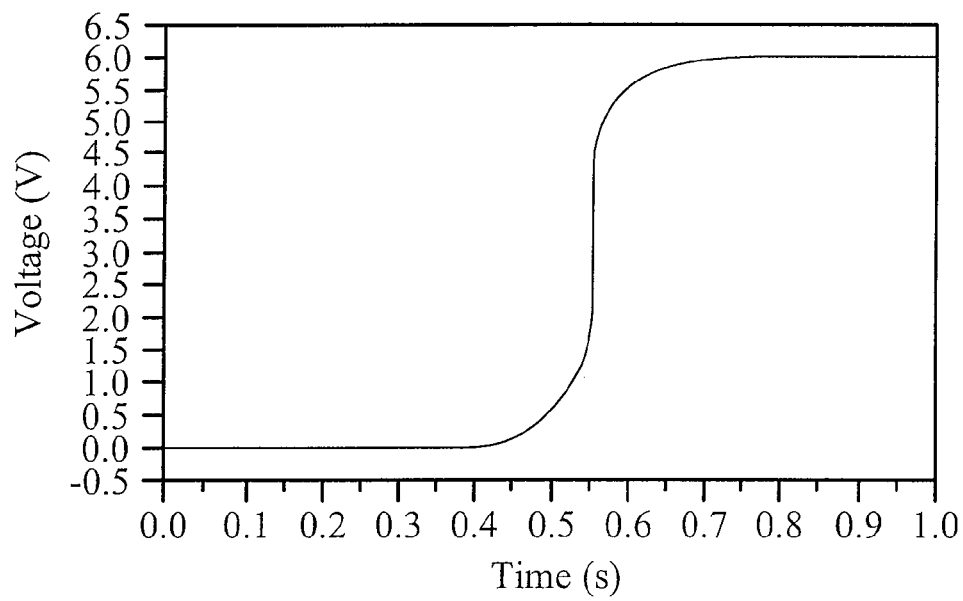

FIGS. 3a~3c are characteristic curves of the voltage signal Vout. It is assumed that a first level is less than a third level, and the third is less than a second level. As shown in FIG. 3a, when the intensity of the detected light is the first level, the voltage signal Vout is low. As shown in FIG. 3b, when the intensity of the detected light is the second level, the voltage signal Vout is transformed from low to high in 0.05 sec. As shown in FIG. 3c, when the intensity of the detected light is the third level, the voltage signal Vout is transformed from low to high in 0.5 sec. Reading module 18 calculates the voltage signal Vout through an integral method or a differential method for obtaining the intensity of the detected light.

Figure 4A:
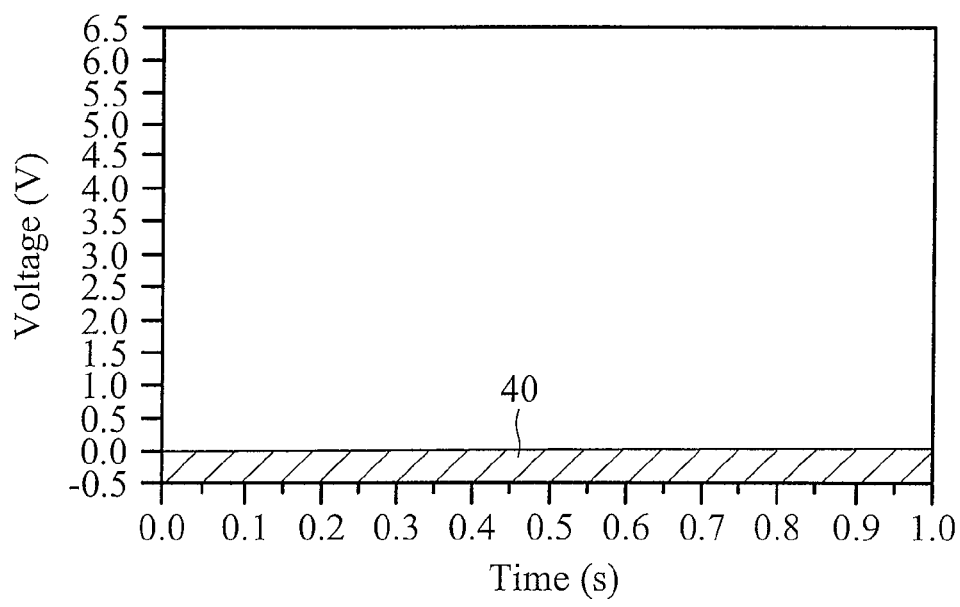
FIGS. 4a~4c, are schematic diagrams of voltage signals calculated through an integral method.
Figure 4B:
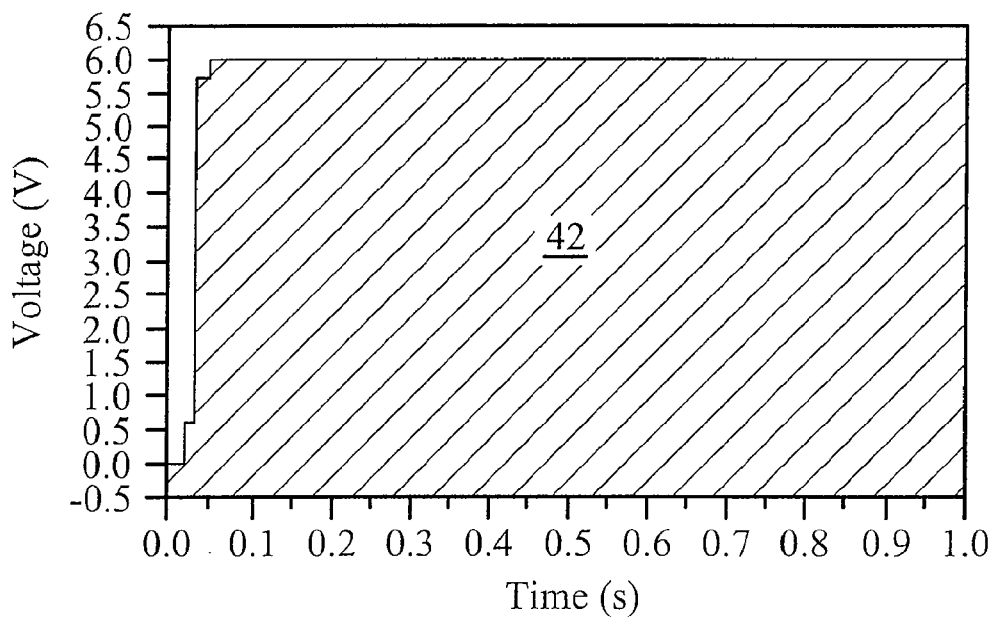
Figure 4C:
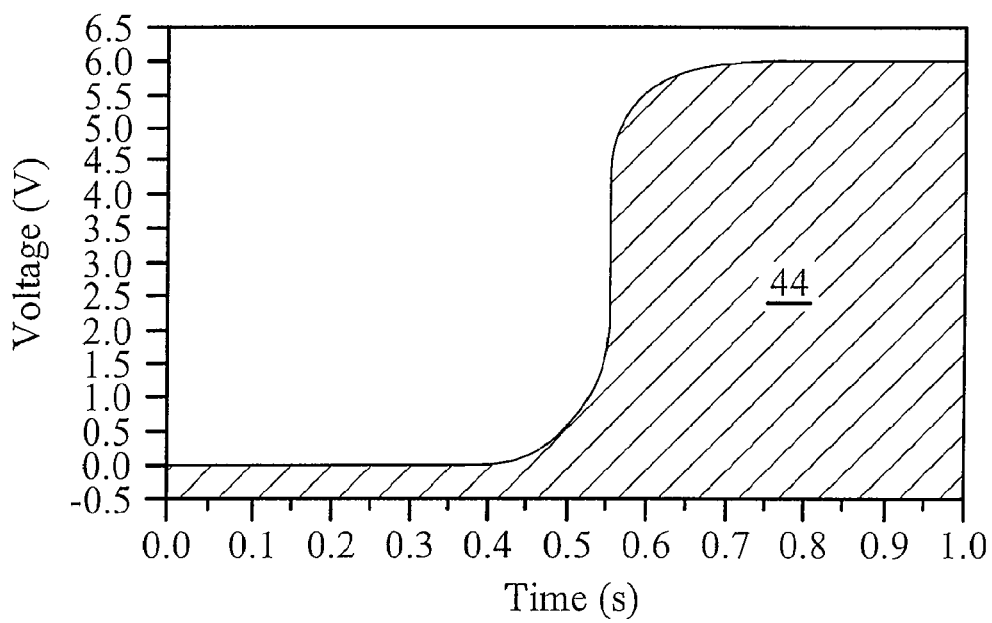

FIGS. 4a~4c, are schematic diagrams of voltage signals calculated through an integral method. When the voltage signal Vout shown in FIG. 3a is calculated through the integral method, the measure of area 40 shown in FIG. 4a is obtained. When the voltage signal Vout shown in FIG. 3b is calculated through an integral method, the measure of area 42 shown in FIG. 4b is obtained. When the voltage signal Vout shown in FIG. 3c is calculated through an integral method, the measure of area 44 shown in FIG. 4c is obtained. According to FIGS. 4a~4c, the measure of area 40 is smaller than that of the area 44, and the measure of area 44 is smaller than that of area 42.

Figure 5A:
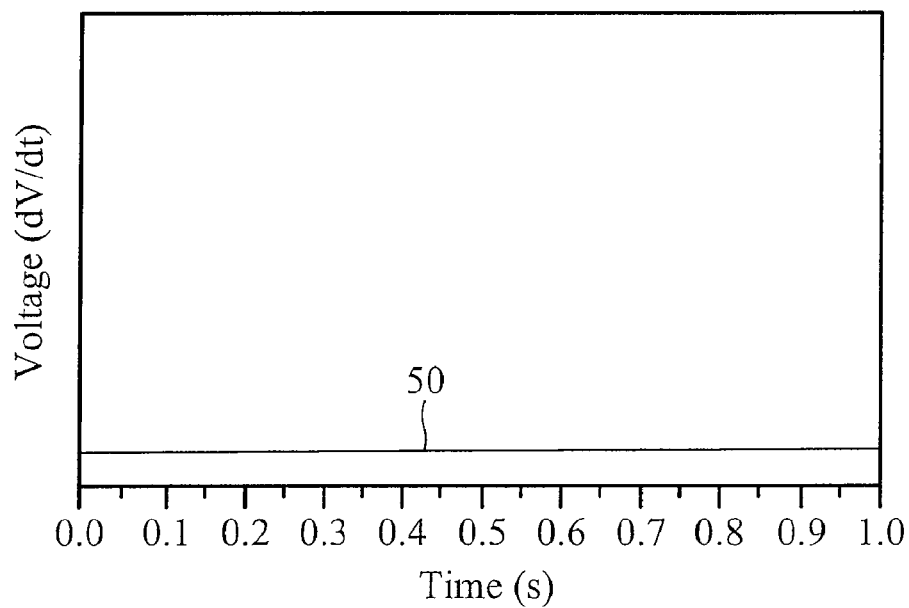
FIGS. 5a~5c, are schematic diagrams of voltage signals calculated through a differential method.
Figure 5B:
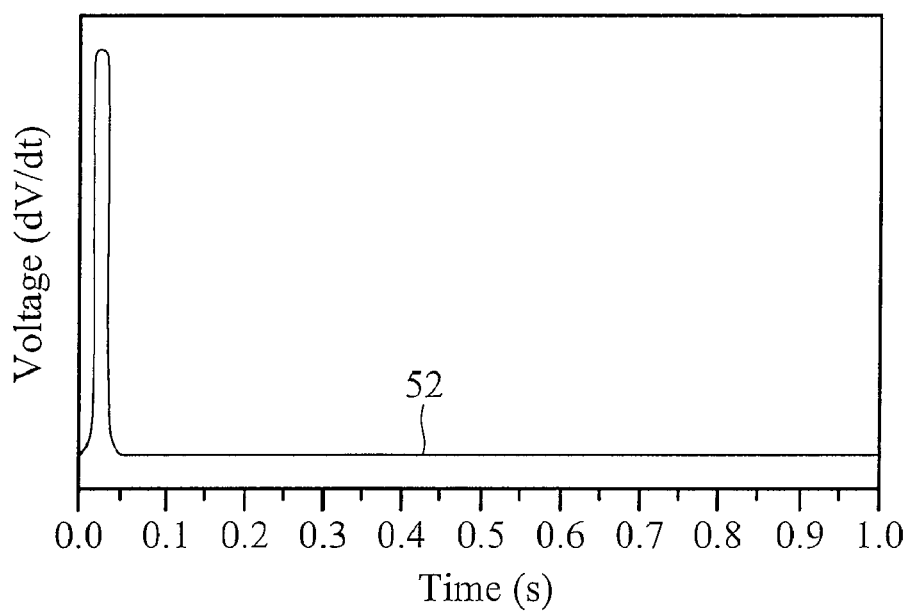
Figure 5C:
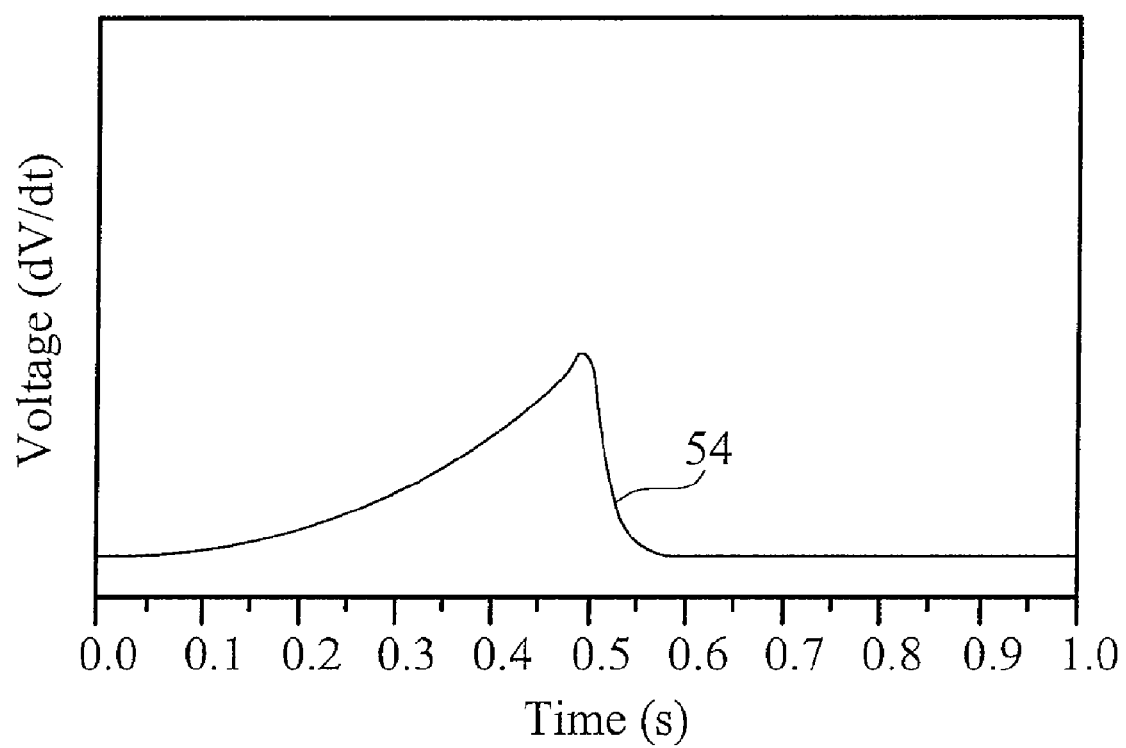

FIGS. 5a~5c are schematic diagrams of voltage signals calculated through a differential method. The voltage signals in FIGS. 5a~5c are calculated by a differential method to respectively obtain curves 50, 52, and 54. The curve 50 has a first maximum integral value, the curve 52 has a second maximum integral value, and the curve 54 has a third maximum integral value. Referring to FIGS. 5a~5c, since the first level is less than the third level and the third is less than the second level, the first maximum integral value is smaller than the third maximum integral value, and the third maximum integral value is smaller than the second maximum integral value.

Thus, reading module 18 can obtain the intensity of the detected light by calculating the voltage signal through an integral or differential method and then determine a gray level of the detected light according to the calculated result. The system thus displays images according to the determined gray level.

Figure 6:
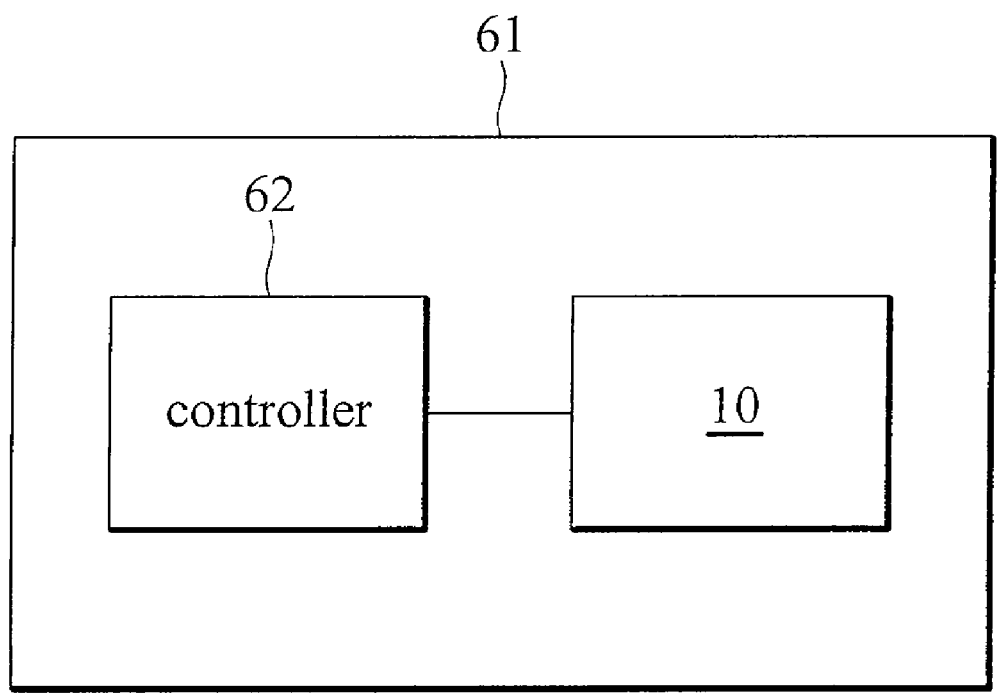
FIG. 6 a schematic diagram of an exemplary embodiment of a system for displaying and capturing images.

FIG. 6 schematically shows an embodiment of another system, in this case an electronic device, for providing a display unit providing a light and a detection module capturing a light. In particular, electronic device 60 employs the previously described display panel 10 of FIG. 1. Electronic device 60 may be a digital camera, a portable DVD, a television, a car display, a PDA, notebook computer, tablet computer, cellular phone, or a display device, etc.

Generally, electronic device 60 includes display panel 10, a housing 61, and a controller 62, although it is to be understood that various other components can be included; however, such other components are not shown or described here for ease of illustration and description. In operation, controller 62 is operatively coupled to display panel 10 and provides control signals, such as clock signals, start pulses, or image data, etc, to display panel 10.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A system for displaying and capturing images, comprising:
   a display unit providing a first light according to a scan signal and a data signal,
      wherein the data signal is transmitted to the display unit through a data line; and
   a detection module capturing a second light and comprising:
      a photo detection unit detecting intensity of the second light;
      a transformation unit coupled to the photo detection unit at a first point and transforming the light intensity into a voltage signal, wherein the transformation unit comprises:
         a P-type transistor comprising a gate couple to the first point, a source receiving the high voltage level, and a drain outputting the voltage signal; and
         an N-type transistor comprising a gate coupled to the first point, a source receiving the low voltage level, and a drain coupled to the drain of the P-type transistor; and a switch unit comprising a transistor which comprises a gate receiving a selection signal, a source outputting the voltage signal through the data line according to the selection signal, and a drain coupled to the drain of the P-type transistor.

2. The system as claimed in claim 1, wherein the photo detection unit comprises:
a capacitor coupled between the first point and a low voltage level; and
a photo sensor parallel with the capacitor and comprising a conductance that changes according to the light intensity for controlling discharge time of the capacitor.

3. The system as claimed in claim 2, further comprising a pre-charge module for charging the capacitor, wherein the pre-charge module stops charging the capacitor when voltage stored in the capacitor reaches a high voltage level.

4. The system as claimed in claim 3, further comprising a reading module coupled to the source of the transistor for reading the voltage signal.

5. The system as claimed in claim 4, wherein the reading module calculates the voltage signal through an integral method or a differential method.

6. The system as claimed in claim 1, further comprising:
a gate driver providing the scan signal and the selection signal; and
a source driver providing the data signal.

7. The system as claimed in claim 6, wherein the frequency of the scan signal exceeds that of the selection signal.

8. The system as claimed in claim 1, wherein the system is implemented as at least one of a digital camera, a portable DVD, a television, a car display, a PDA, a display monitor, a notebook computer, a tablet computer, or a cellular phone.

9. The system as claimed in claim 1, wherein the second light is a reflected light from a surface of an object when the surface of the object is irradiated by the first light.

10. The system as claimed in claim 9, further comprising a reading module for reading the voltage signal and determining a gray level of the surface of the object according to the voltage signal.

11. A system for displaying and capturing images, comprising:
a display unit providing a first light according to a scan signal and a data signal; and
a detection module capturing a second light and comprising;
a photo detection unit detecting intensity of the second light;
a transformation unit transforming the light intensity into a voltage signal, wherein the transformation unit comprises:
a P-type transistor comprising a gate couple to the first point, a source receiving the high voltage level, and a drain outputting the voltage signal; and a N-type transistor comprising a gate coupled to the first point, a source receiving the low voltage level, and a drain coupled to the drain of the P-type transistor; and
a switch unit comprising a transistor which comprises a gate receiving the selection signal, a source outputting the voltage signal according to the selection signal, and a drain coupled to the drain of the P-type transistor.

12. The system as claimed in claim 11, wherein the photo detection unit comprises:
a capacitor coupled between a first point and a low voltage level; and
a photo sensor parallel with the capacitor and comprising a conductance that changes according to the light intensity for controlling discharge time of the capacitor.

13. The system as claimed in claim 12, further comprising a pre-charge module for charging the capacitor, wherein the pre-charge module stops charging the capacitor when voltage stored in the capacitor reaches a high voltage level.

14. The system as claimed in claim 11,
wherein the system further comprises a reading module coupled to the source of the transistor for reading the voltage signal.

15. The system as claimed in claim 11, further comprising:
a gate driver providing the scan signal and the selection signal; and
a source driver providing the data signal, wherein the frequency of the scan signal exceeds that of the selection signal.

16. The system as claimed in claim 11, wherein the system is implemented as at least one of a digital camera, a portable DVD, a television, a car display, a PDA, a display monitor, a notebook computer, a tablet computer, or a cellular phone.

* * * * *